US009247185B2

(12) United States Patent
Kinouchi

(10) Patent No.: US 9,247,185 B2
(45) Date of Patent: Jan. 26, 2016

(54) PLAYBACK APPARATUS, PLAYBACK METHOD AND PROGRAM

(71) Applicant: Sony Corporation, Tokyo (JP)

(72) Inventor: Takashi Kinouchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/657,284

(22) Filed: Mar. 13, 2015

(65) Prior Publication Data

US 2015/0189220 A1 Jul. 2, 2015

Related U.S. Application Data

(63) Continuation of application No. 13/929,354, filed on Jun. 27, 2013, now Pat. No. 9,043,847, which is a continuation of application No. 11/970,010, filed on Jan. 7, 2008, now Pat. No. 8,497,944.

(30) Foreign Application Priority Data

Feb. 16, 2007 (JP) ................................. 2007-037022

(51) Int. Cl.
*H04N 7/18* (2006.01)
*H04N 5/63* (2006.01)
(Continued)

(52) U.S. Cl.
CPC ................ *H04N 5/63* (2013.01); *G11B 19/022* (2013.01); *G11B 27/105* (2013.01); *G11B 27/11* (2013.01); *H04N 5/60* (2013.01); *H04N 5/7408* (2013.01); *H04N 5/7755* (2013.01); *H04N 21/4333* (2013.01); *H04N 5/64* (2013.01)

(58) Field of Classification Search
CPC ........................ H04N 21/43615; H04N 7/106
See application file for complete search history.

(56) References Cited

U.S. PATENT DOCUMENTS

| 8,497,944 | B2 | 7/2013 | Kinouchi |
| 2006/0271999 | A1 | 11/2006 | Wakako et al. |
| 2006/0274053 | A1 | 12/2006 | Kinouchi |

FOREIGN PATENT DOCUMENTS

| JP | 10-340066 | 12/1998 |
| JP | 2001-235566 | 8/2001 |

(Continued)

OTHER PUBLICATIONS

Apple, Ipod 5th Generation features guide, Sep. 11, 2006, 74 pp.

(Continued)

*Primary Examiner* — Hunter B Lonsberry
(74) *Attorney, Agent, or Firm* — Oblon, McClelland, Maier & Neustadt, L.L.P.

(57) ABSTRACT

A playback apparatus to play back content data including sound data includes an instruction operating portion to detect an instruction operation that instructs execution of prescribed processing, a hold operating portion to detect a hold setting operation that sets a state of not accepting the instruction operation to the instruction operating portion, a state control portion to set the state of not accepting the instruction operation to the instruction operating portion if the hold setting operation is detected by the hold operating portion, and a video processing portion to perform processing for displaying a video. If the video processing portion performs processing for displaying the video when the hold setting operation is detected, the state control portion controls the video processing portion to suspend at least a part of processing for displaying the video.

45 Claims, 11 Drawing Sheets

(51) Int. Cl.
- *G11B 19/02* (2006.01)
- *G11B 27/10* (2006.01)
- *G11B 27/11* (2006.01)
- *H04N 5/60* (2006.01)
- *H04N 5/775* (2006.01)
- *H04N 21/433* (2011.01)
- *H04N 5/74* (2006.01)
- *H04N 5/64* (2006.01)

(56) References Cited

FOREIGN PATENT DOCUMENTS

| | | |
|---|---|---|
| JP | 2002-268776 | 9/2002 |
| JP | 2006-40408 | 2/2006 |
| JP | 2007-6457 | 1/2007 |

OTHER PUBLICATIONS

Office Action issued Dec. 27, 2011 in Japan Application No. 2007-037022.

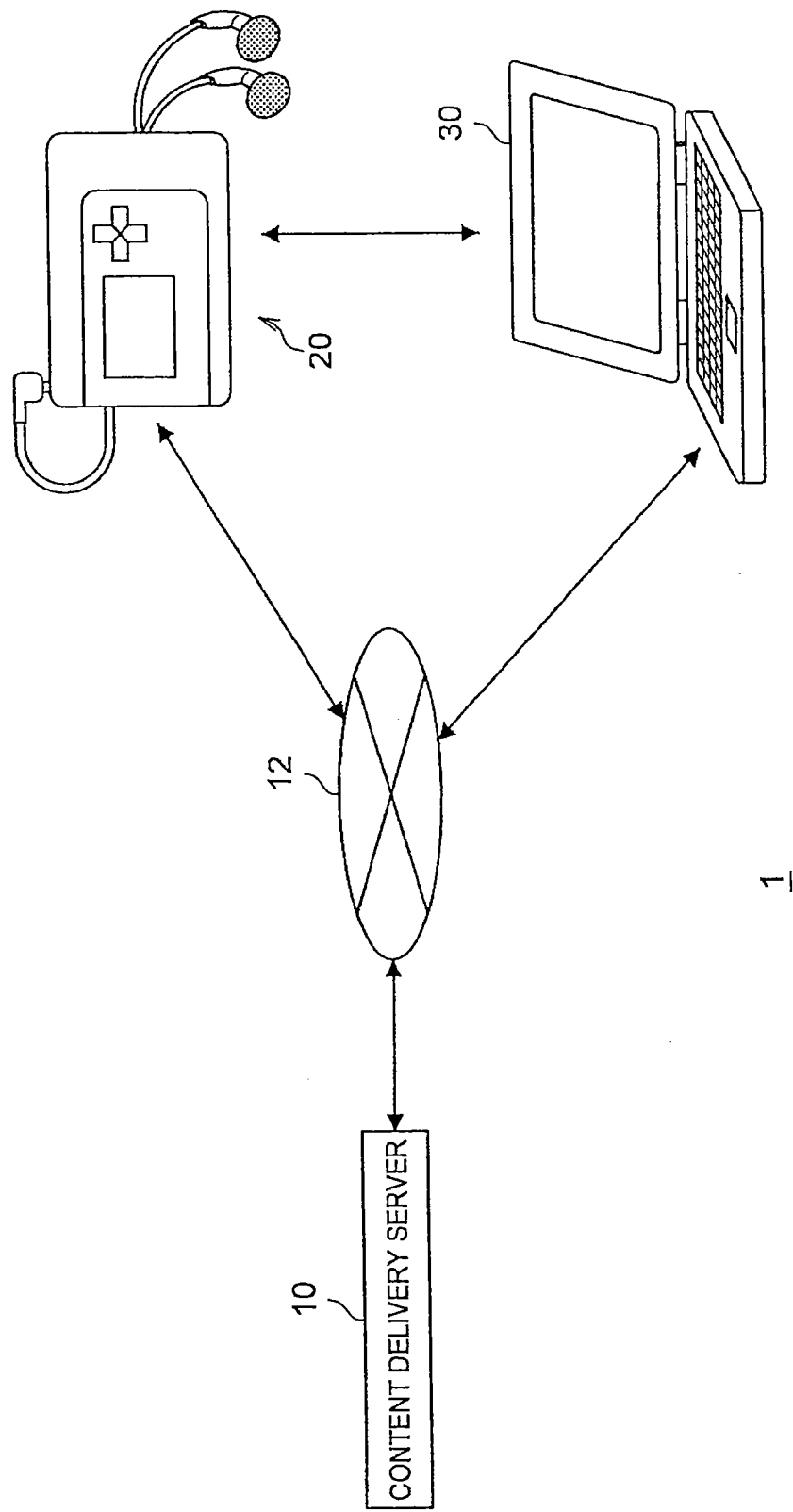

PLAYBACK APPARATUS, PLAYBACK METHOD AND PROGRAM

CROSS REFERENCES TO RELATED APPLICATIONS

The present application is a continuation of U.S. patent application Ser. No. 13/929,354 filed Jun. 27, 2013, which is a continuation of U.S. patent application Ser. No. 11/970,010, filed Jan. 7, 2008, which contains subject matter related to Japanese Patent Application JP 2007-037022 filed in the Japan Patent Office on Feb. 16, 2007, the entire contents of which being incorporated herein by reference.

BACKGROUND OF THE INVENTION

1. Field of the Invention

The present invention relates to a playback apparatus, a playback method and a computer program.

2. Description of the Related Art

A portable device that is capable of playing back content data such as movies and TV programs that contains video data and sound data is widely available today. Such a portable device generally includes a video decoder to decode video data, a display to display decoded video data, a sound decoder to decode sound data, and a sound output portion to output decoded sound data.

For example, Japanese Unexamined Patent Application Publication No. 10-340066 discloses a portable device for image display that displays moving picture data or still picture data which are decoded by a video decoder on a display and outputs sound data that are decoded by a sound decoder from a speaker.

SUMMARY OF THE INVENTION

However, in some instances, depending on the environment of a user of a portable device or content data that are played back in a portable device, it may be unnecessary to play back a video or a sound. For instance, on a crowded train, video playback is not necessary because it is difficult to hand-hold a portable device to watch a video. Further, if components such as a video decoder, a display, a sound decoder and a sound output portion are kept operating while playing back content data, a power of a portable device, which is a limited resource, is excessively consumed.

In light of the foregoing, there is a need for new, improved playback apparatus, playback method and program which are capable of suspending at least a part of processing that is related to playback of content data as necessary, thereby suppressing power consumption.

According to an embodiment of the present invention, there is provided a playback apparatus to play back content data including sound data which includes an instruction operating portion to detect an instruction operation that instructs execution of prescribed processing, a hold operating portion to detect a hold setting operation that sets a state of not accepting the instruction operation to the instruction operating portion, a state control portion to set the state of not accepting the instruction operation to the instruction operating portion if the hold setting operation is detected by the hold operating portion, and a video processing portion to perform processing for displaying a video. In this playback apparatus, if the video processing portion performs processing for displaying the video when the hold setting operation is detected, the state control portion controls the video processing portion to suspend at least a part of processing for displaying the video.

In this configuration, if the hold setting operation that sets the state of not accepting the instruction operation to the instruction operating portion is detected by the hold operating portion, the state control portion makes control so as to suspend at least a part of processing for displaying a video on the video processing portion such as a display portion and a decoding portion. Therefore, in a scene where a user cannot view a display screen of the playback apparatus such as on a crowded train or during driving or in a case where content data in which a video is not necessarily important is played back, a user performs the hold setting operation onto the hold operating portion so as to suspend at least a part of processing in the video processing portion, thereby suppressing power consumption in the video processing portion and the playback apparatus.

Further, in a scene where a user cannot view a display screen of the playback apparatus such as on a crowded train or during driving of a vehicle, a user often puts the playback apparatus in a pocket or a bag after setting the playback apparatus to the state of not accepting a user operation. Because a user cannot see the display screen of the playback apparatus when the playback apparatus is put in a pocket or a bag, the video processing portion does not need to perform processing for displaying a video. Thus, the scene where a user sets the playback apparatus to the state of not accepting a user operation and the scene where the processing for displaying a video by the video processing portion is unnecessary are likely to correspond.

In light of the foregoing, the playback apparatus is capable of performing the setting of whether or not to accept the instruction operation and the setting of whether or not to suspend at least a part of processing in the video processing portion in conjunction with each other in accordance with the setting operation to the hold operating portion. It is thereby possible to perform the setting to the state of not accepting the instruction operation in the playback apparatus and the suspension of at least a part of processing in the video processing portion simply by user's hold setting operation onto the hold operating portion, thereby improving the user-friendliness.

The video processing portion may include a display portion to display a video, and, if the hold setting operation is detected by the hold operating portion, the state control portion may control the display portion to suspend display of a video. In this configuration, when the hold setting operation to the hold operating portion is detected, the suspension of video display on the display portion and the setting to the state of not accepting the instruction operation to the instruction operating portion are performed in conjunction with each other. A user can thereby perform the hold setting operation to the hold operating portion according to need so as to suspend the display of a video on the display portion, thereby suppressing power consumption in the display portion and the playback apparatus.

If the display portion is a liquid crystal display, the suspension of the video display may be the shut-off of a backlight of the liquid crystal display, the stop of voltage application to liquid crystal molecules, or the stop of voltage application to the backlight of the liquid crystal display and the liquid crystal molecules.

The state control portion may control the display portion to suspend display of a video when a first prescribed time is elapsed after the hold setting operation is detected by the hold operating portion. The state control portion perform the setting of whether or not to accept the instruction operation to the instruction operating portion based on the hold setting operation to the hold operating portion. A user can sometimes manipulate the hold operating portion accidentally or unconsciously. It is inconvenient for a user that the display of a video on the display portion is stopped every time such an erroneous operation is made. Thus, the display portion is configured to suspend the display of a video when a first prescribed time is elapsed after the state of not accepting the instruction operation to the instruction operating portion is set, thereby preventing the video display on the display portion from being stopped every time a user manipulates the hold operating portion accidentally or unconsciously.

Further, the state control portion may control the display portion to temporarily perform display of a video if the instruction operation to the instruction operating portion is detected while the display portion suspends display of a video based on the hold setting operation. For example, even when the video display is stopped, a user may want to watch a video of content data based on the sound of the content data that is being played back. In the playback apparatus with the above-described configuration, a user can display the video temporarily on the display portion by performing the instruction operation that instructs the execution of prescribed processing to the instruction operating portion.

The state control portion may control the display portion to restart display of the video if a given user operation is detected after a hold release operation that releases the state of not accepting the instruction operation is detected.

Further, the video processing portion may include a decoding portion to decode video data in a moving picture format included in content data, and the state control portion may control the decoding portion to suspend decoding of the video data if the hold setting operation is detected by the hold operating portion. In this configuration, when the hold setting operation to the hold operating portion is detected, the suspension of decoding of video data by the decoding portion and the setting to the state of not accepting the instruction operation to the instruction operating portion are performed in conjunction with each other. A user can thereby perform the hold setting operation to the hold operating portion according to need so as to suspend the decoding of video data by the decoding portion, thereby suppressing power consumption in the decoding portion and the playback apparatus.

Furthermore, the state control portion may control the decoding portion to suspend decoding of the video data when a second prescribed time is elapsed after the hold setting operation is detected by the hold operating portion. The display portion can restart suspended video display substantially without a delay after the instruction of video display is given. On the other hand, the decoding portion may generate a delay from the instruction of the execution of video data decoding to the video data decoding and output. Thus, even when the hold setting operation is accidentally detected by the hold operating portion, the decoding portion is controlled to keep decoding the video data until a certain time is elapsed, thereby enabling prompt redisplay of a video after the instruction of video display is given to the playback apparatus.

The state control portion may control the video processing portion to restart suspended processing for displaying a video if a hold release operation that releases the state of not accepting the instruction operation is detected.

The playback apparatus may further include a volume operating portion to detect a volume control operation that controls a volume of a sound to be played back in the playback apparatus based on the sound data, and the volume control operation to the volume operating portion may be set effective while the state of not accepting the instruction operation to the instruction operating portion is set. In this configuration, if a user performs a volume control operation onto the volume operating portion, the volume of a sound to be played back is adjusted regardless of whether or not the state control portion sets the state of not accepting the instruction operation to the instruction operating portion. This is effective in that a user does not have to release the state of not accepting the instruction operation to the instruction operating portion for volume control.

According to another embodiment of the present invention, there is provided a program for causing a computer to serve as a playback apparatus to play back content data including sound data, which includes an instruction operating portion to detect an instruction operation that instructs execution of prescribed processing, a hold operating portion to detect a hold setting operation that sets a state of not accepting the instruction operation to the instruction operating portion, a state control portion to set the state of not accepting the instruction operation to the instruction operating portion if the hold setting operation is detected by the hold operating portion, and a video processing portion to perform processing for displaying a video. In this program, if the video processing portion performs processing for displaying the video when the hold setting operation is detected, the state control portion controls the video processing portion to suspend at least a part of processing for displaying the video.

The above program may cause a computer hardware resource which includes CPU, ROM. RAM or the like to execute the function of the above-described state control portion, the video processing portion or the like. It is thereby possible to allow a computer that implements the program to serve as the above-described playback apparatus.

The video processing portion may include a display portion to display a video, and, the state control portion may control the display portion to suspend display of the video if the hold setting operation is detected by the hold operating portion.

The state control portion may control the display portion to suspend display of the video when a first prescribed time is elapsed after the hold setting operation is detected by the hold operating portion.

The video processing portion may include a decoding portion to decode video data in a moving picture format included in content data, and the state control portion may control the decoding portion to suspend decoding of the video data if the hold setting operation is detected by the hold operating portion.

The state control portion may control the decoding portion to suspend decoding of the video data when a second prescribed time is elapsed after the hold setting operation is detected by the hold operating portion.

According to another embodiment of the present invention, there is provided a playback method in a playback apparatus to play back content data including sound data, which includes the steps of playing back the content data, detecting a hold setting operation that sets a state of not accepting an instruction operation that instructs prescribed processing to the playback apparatus, setting to the state of not accepting the instruction operation, and suspending at least a part of processing for displaying a video in playback of the content data.

In this configuration, if the hold setting operation that sets the state of not accepting the instruction operation that instructs prescribed processing to the playback apparatus is detected, the playback apparatus is set to the state of not accepting the instruction operation, and the playback apparatus further suspends at least a part of processing for displaying a video. The playback method thus performs the setting of whether or not to accept the instruction operation that instructs prescribed processing and the setting of whether or not to suspend at least a part of processing for displaying a video in conjunction with each other, thereby improving the user-friendliness.

According to another embodiment of the present invention, there is provided a playback apparatus to play back content data including sound data and video data that are synchronously played back, which includes an instruction operating portion to detect an instruction operation that instructs execution of prescribed processing, a hold operating portion to detect a hold setting operation that sets a state of not accepting the instruction operation to the instruction operating portion, a state control portion to set the state of not accepting the instruction operation to the instruction operating portion based on the hold setting operation, a sound processing portion to perform processing for outputting a sound based on the sound data. In this playback apparatus, if the sound processing portion performs processing for outputting the sound when the hold setting operation is detected by the hold operating portion, the state control portion controls the sound processing portion to suspend at least a part of processing for outputting the sound.

The sound processing portion may include a sound output portion to output a sound based on the sound data, and the state control portion may control the sound processing portion to suspend output of the sound when a first prescribed time is elapsed after the hold setting operation is detected by the hold operating portion. In this configuration, when the hold setting operation to the hold operating portion is detected, the suspension of sound output by the sound output portion and the setting to the state of not accepting the instruction operation to the instruction operating portion are performed in conjunction with each other. A user can thereby perform the hold setting operation to the hold operating portion according to need so as to suspend the output of a sound by the sound output portion, thereby suppressing power consumption in the sound output portion and the playback apparatus.

The state control portion may control the sound output portion to temporarily perform output of the sound if the instruction operation to the instruction operating portion is detected while the sound output portion suspends output of the sound based on the hold setting operation. For example, even when the sound output is stopped, a user may want to listen to the sound of content data based on the video of the content data that is being played back. In the playback apparatus with the above-described configuration, a user can make the sound temporarily output from the sound output portion by performing the instruction operation that instructs the execution of prescribed processing to the instruction operating portion.

The state control portion may control the sound output portion to restart output of the sound if a given user operation is detected after a hold release operation that releases the state of not accepting the instruction operation is detected.

The sound processing portion may include a sound decoding portion to decode the sound data, and the state control portion may control the sound decoding portion to suspend output of the sound when a second prescribed time is elapsed after the hold setting operation is detected by the hold operating portion.

According to the embodiments of the present invention described above, it is possible to suspend at least a part of processing that is related to playback of content data as necessary in a playback apparatus, thereby suppressing power consumption.

BRIEF DESCRIPTION OF THE DRAWINGS

FIG. 1 is an illustration showing the configuration of a content communication system according to a first embodiment of the present invention.

DETAILED DESCRIPTION OF THE PREFERRED EMBODIMENTS

Figure 2A:
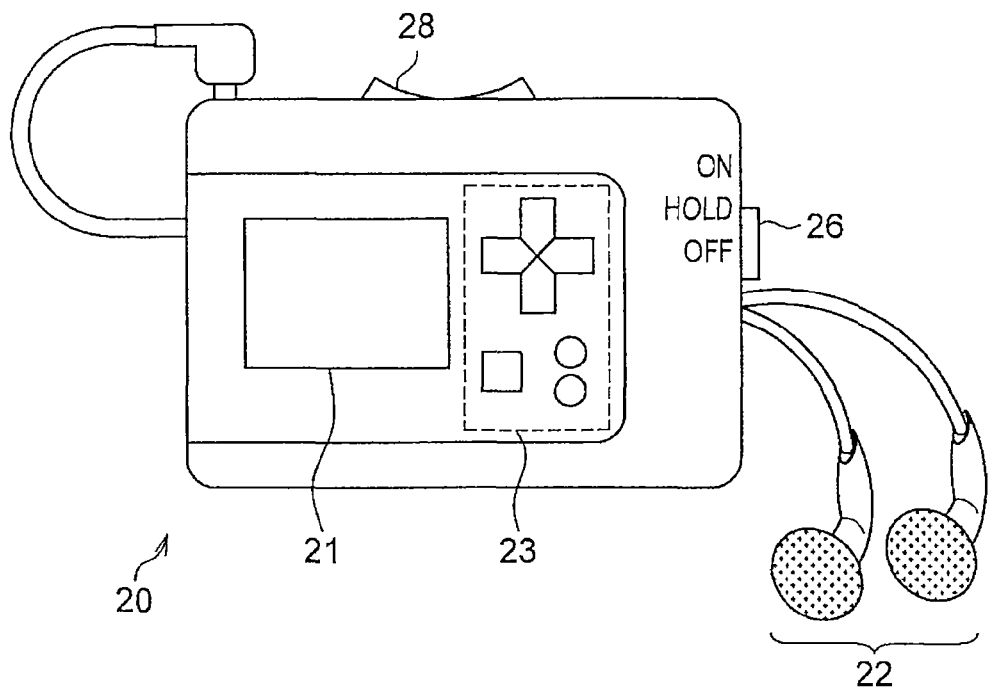
FIGS. 2A and 2B illustrate an exemplary external structure of the portable device according to the first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

A first embodiment of the present invention is described hereinafter. In the description of the embodiment below, a content communication system 1 that includes a portable device 20 as a playback apparatus is described firstly with reference to FIGS. 1 and 2, the configuration of the portable device 20 of this embodiment is then described with reference to FIGS. 3 and 4, and the operation of the portable device 20 of this embodiment is described with reference to FIGS. 5 to 13 after that. In this description, "playback" is used in referring to "reproduce".

FIG. 1 is an illustration showing the configuration of the content communication system 1 according to this embodiment. The content communication system 1 includes a content delivery server 10, a communication network 12, the portable device 20 and a PC 30. In the content communication system 1, the portable device 20 can play back content data.

The content delivery server 10 delivers, transmits or broadcasts content data to the portable device 20 or the PC 30 through the communication network 12. For example, the content delivery server 10 may perform digital radio broadcasting or one-segment broadcasting that transmits content data in a digital format over a radio wave through the communication network 12. The communication network 12 may include a wire cable such as a copper wire or a fiber-optic cable, a data transmission line such as a radio wave, or a data relay station such as a router or a base station to control communication.

The content data indicate a concept that includes music data such as music, lectures and radio programs, video and/or sound data such as movies, TV programs, video programs, photographs, documents, paintings and graphic charts, and given data such as games and software.

The PC 30 may record the content data that are broadcasted from the content delivery server 10 through the communication network 12 into a built-in memory. The PC 30 may also record the content data that are stored in optical disks such as CD-R (Compact Disc Recordable)/RW (ReWritable), DVD-R (Digital Versatile Disk Recordable)/RW/+R/+RW/ RAM (Random Access Memory) and BD (Blu-ray Disc (registered trademark))-R/BD-RE into a built-in memory.

The PC 30 may transmit the content data that are recorded in a built-in memory to the portable device 20 or manage the data structure of the content data and a content data search database that are stored in the portable device 20. The PC 30 may transmit the content data to the portable device 20 by downloading or streaming. The streaming is a technique that transmits content data in chronological order in synchronization with a playback speed of the content data in the portable device 20. On the other hand, the downloading is a technique that permits playback of content data in the portable device 20 after transmitting the entire content data to the portable device 20.

The portable device 20 may record the content data that are transmitted from the content delivery server 10 or the content data that are transmitted from the PC 30 to a memory. Further, the portable device 20 may store a search database that contains metadata corresponding to one or more than one content data in hierarchical fashion in order to search the content data that are stored in the memory. The portable device 20 also has a function of playing back the content data corresponding to the metadata that are searched using the search database. An example of the external structure of the portable device 20 is described hereinbelow with reference to FIGS. 2A and 2B.

Figure 2B:
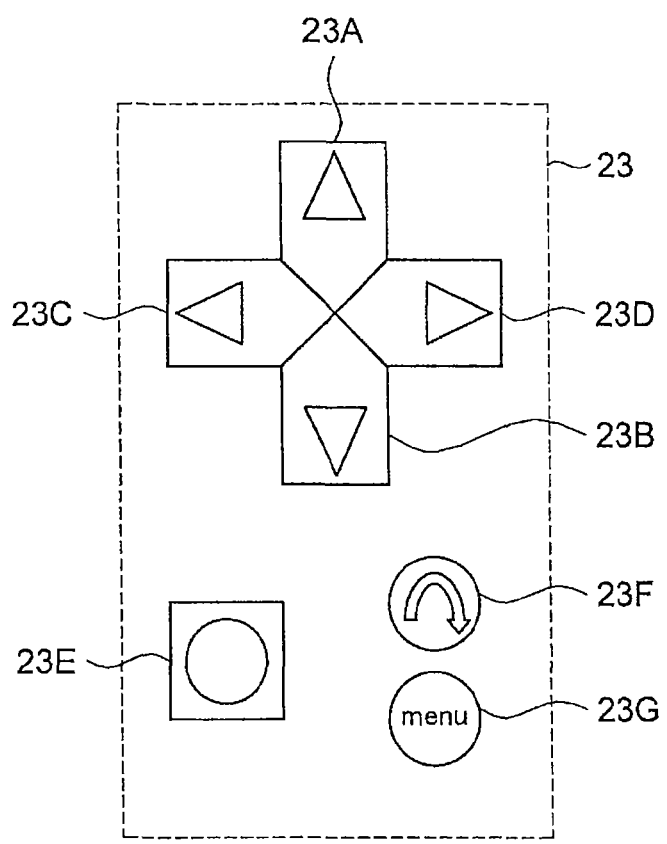

FIGS. 2A and 2B illustrate an exemplary external structure of the portable device 20 according to the present embodiment. Specifically, FIG. 2A is a front view of the portable device 20 according to this embodiment, and FIG. 2B is an illustration that shows an instruction operating portion 23 of the portable device 20 according to this embodiment in a larger scale. In the example of FIG. 2A, the portable device 20 includes a display portion 21, a sound output portion 22, an instruction operating portion 23, a hold operating portion 26 and a volume operating portion 28.

The display portion 21 has a function of displaying a video, and it may be an LCD (Liquid Crystal Display), an organic EL (Electro Luminescence) display, or a plasma display. The display portion 21 may display a video that is based on video data included in content data, a video that indicates a playback status of content data and so on.

The sound output portion 22 has a function of outputting a sound based on sound data included in content data. FIG. 2A shows earphones merely as an example of the sound output portion 22, and the sound output portion 22 may be a speaker, a headphone, or the like.

The instruction operating portion 23 detects an instruction operation that instructs execution of prescribed processing to the portable device 20 or instructs data input to the portable device 20. The prescribed processing may be playback of content data, pause of content data, fast-forwarding of content data, fast-rewinding of content data or the like. As shown in FIG. 2B, the instruction operating portion 23 includes a cross key such as an up button 23A, a down button 23B, a left button 23C and a right button 23D, an enter button 23E, a return button 23F and a menu button 23G.

The buttons 23A to 23D of the cross key are used when moving a cursor to each option that is displayed on the display portion 21. For example, pressing the up button 23A may cause a cursor to move upward, pressing the down button 23B may cause a cursor to move downward, pressing the left button 23C may cause a cursor to move leftward, and pressing the right button 23D may cause a cursor to move rightward. The options to be selected may be a name of content, a title of an album, a kind of metadata of content to be edited and so on.

The enter button 23E is used when executing the option on which a cursor is placed. The return button 23F is used when returning a display screen on the display portion 21 to a previous state. The menu button 23G is used when displaying a menu screen for making a selection from various settings such as setting of metadata of content data and setting of a screen format to be displayed on the display portion 21.

The cross key, the enter button 23E and so on are shown merely an example of a specific structure of the instruction operating portion 23, and the instruction operating portion 23 may be a touch panel, a button, a switch, a lever, a dial, a photoreceptor for an infrared signal generated by a remote controller or the like.

The hold operating portion 26 detects an operation by a user for switching the setting whether or not to accept an instruction operation that instructs the execution of prescribed processing or the like to the instruction operating portion 23. When a user performs a hold-on operation (hold setting operation) that turns on the hold operating portion 26, it enables a hold-on state that does not accept an instruction operation that instructs the execution of prescribed processing or the like to the instruction operating portion 23. On the other hand, when a user performs a hold-off operation (hold release operation) that turns off the hold operating portion 26, it enables a hold-off state that accepts an instruction operation that instructs the execution of prescribed processing or the like to the instruction operating portion 23. For example, when the hold operating portion 26 is off, the portable device 20 plays back content according to a playback instruction operation that instructs the playback of content. When, on the other hand, the hold operating portion 26 is on, the portable device 20 does not play back content even if a playback instruction operation that instructs the playback of content is detected.

The volume operating portion 28 has a function of detecting a volume control operation by a user and controlling the volume of a sound that is played back through the sound output portion 22 such as earphones. For example, pressing one side of the volume operating portion 28 may cause a volume to decrease, and pressing the other side of the volume operating portion 28 may cause a volume to increase.

Although FIGS. 1 and 2 show the portable device 20 as an example of a playback apparatus, the playback apparatus may be information processing apparatus such as a mobile phone, a PHS (Personal Handyphone System), a portable music playback apparatus, a portable video processing apparatus, a PDA (Personal Digital Assistant), a portable game device, a household electrical appliance or the like.

As described in the foregoing, the portable device 20 of this embodiment is capable of playing back content data that are obtained from the content delivery server 10, the PC 30 or the like. Depending on the environment of a user of the portable device 20 or content data that are played back in the portable device 20, it may be unnecessary to play back a video or a sound. For instance, if content data place much importance on a sound, video playback may be unnecessary. Further, if components such as a video decoder, a display, a sound decoder and a sound output portion are kept operating while playing back content data, a power of a portable device, which is a limited resource, is excessively consumed.

In light of the foregoing, there has been invented the portable device 20 which is capable of suspending at least a part of the processing that is related to playback of content data in a playback apparatus as necessary to thereby suppress power consumption. The configuration and the operation of the portable device 20 according to the present embodiment are described hereinbelow in detail with reference to FIGS. 3 to 14.

Figure 3:
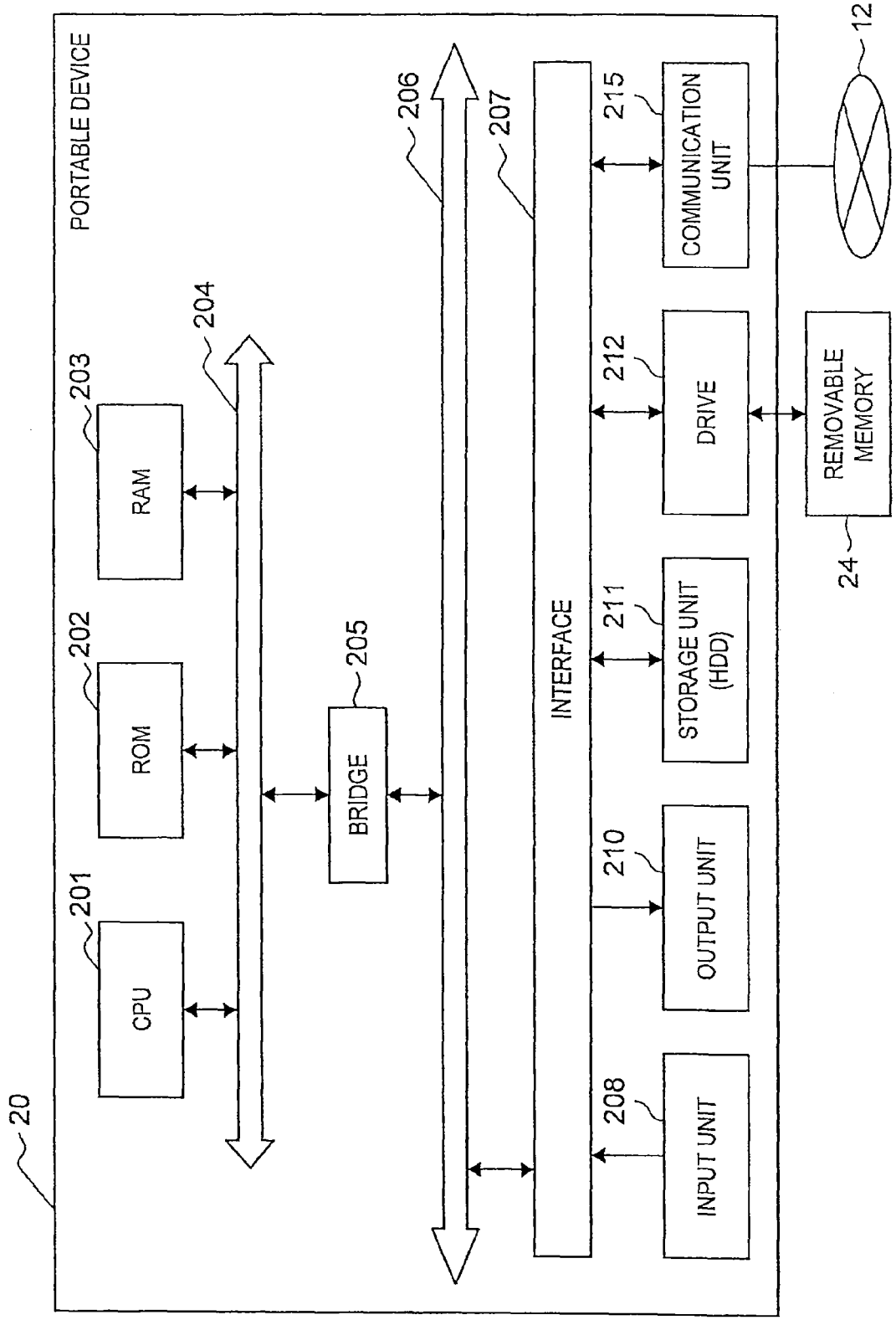
FIG. 3 is an illustration showing the hardware configuration of the portable device according to the first embodiment of the present invention.

FIG. 3 is an illustration showing the hardware configuration of the portable device 20 according to this embodiment. The portable device 20 includes a CPU (Central Processing Unit) 201, a ROM (Read Only Memory) 202, a RAM (Random Access Memory) 203, a host bus 204, a bridge 205, an external bus 206, an interface 207, an input unit 208, an output unit 210, a storage unit (HDD) 211, a drive 212 and a communication unit 215.

The CPU 201 serves as a processing unit and a control unit, and it controls the overall operation in the portable device 20 according to each program. The CPU 201 may be a microprocessor. The ROM 202 stores a program to be used by the CPU 201, a processing parameter and so on. The RAM 203 temporarily stores a program to be used in the execution of the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from each other, and their functions may be implemented by one bus.

The input unit 208 may include the instruction operating portion 23 to be used by a user to input information, such as a mouse, a keyboard, a touch panel, a button, a microphone, a switch or a lever, and an input control circuit to generate an input signal based on a user input and output it to the CPU 201, for example. A user of the portable device 20 manipulates the input unit 208 to thereby input various data or instruct processing operation to the portable device 20.

The output unit 210 may include a display device such as a CRT (Cathode Ray Tube) display device, an LCD device or a lamp, and a sound output device such as a speaker or a headphone, for example. The output unit 210 may output reproduced content. Specifically, the display device, which corresponds to the display portion 21, displays information such as reproduced video data by a text or an image. The sound output device, which corresponds to the sound output portion 22, converts reproduced sound data or the like into a sound and outputs it.

The storage unit 211 is a device for data storage that is configured as an example of a storage portion of the portable device 20 according to this embodiment, and it may include a memory, a recording device to record data into the memory, a reading device to read data from the memory, a deleting device to delete data recorded in the memory and so on. The storage unit 211 may be an HDD (Hard Disk Drive). The storage unit 211 drives a hard disk and stores a program to be executed by the CPU 201 or various data. The storage unit 211 also stores content data and a search database for searching content data. The storage unit 211 or memory may be detachable from the portable device 20.

The drive 212 is a memory reader/writer, and it may be built in the portable device 20 or attached externally. The drive 212 reads information that is recorded on a removable memory 24 such as a magnetic disk, an optical disk, a magneto-optical disk or a semiconductor memory which is attached thereto and outputs the information to the RAM 203.

The communication unit 215 may be a communication interface that includes a communication device or the like to establish connection with the communication network 12. The communication unit 215 may be a communication device compatible with a wireless LAN (Local Area Network), a communication device compatible with a wireless USB, a wire communication device that performs wired communication, or a receiving device of digital radio broadcasting, or it may include an antenna or a TV tuner. The communication unit 215 may transmit/receive content data to/from the content delivery server 10 or the PC 30 through the communication network 12.

The hardware configuration of the portable device 20 according to this embodiment is described in the foregoing with reference to FIG. 3. The function of the portable device 20 is now described with reference to FIG. 4.

Figure 4:
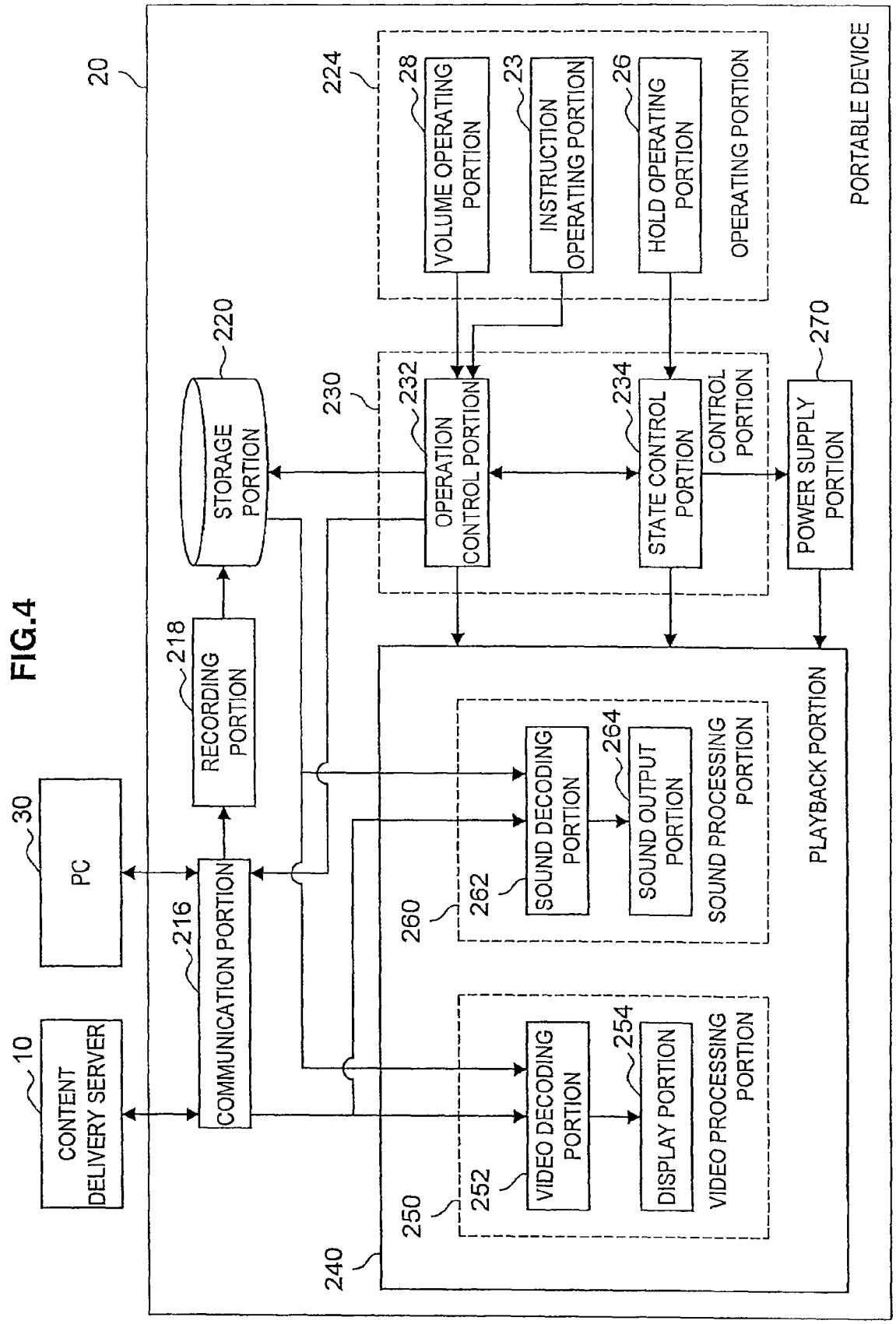
FIG. 4 is a functional block diagram showing the configuration of the portable device according to the first embodiment of the present invention.

FIG. 4 is a functional block diagram showing the configuration of the portable device 20 according to the present embodiment. The portable device 20 includes a communication portion 216, a recording portion 218, a storage portion 220, an operating portion 224, a control portion 230, a playback portion 240, and a power supply portion 270.

The communication portion 216 is an interface with an external device such as the content delivery server 10 and the PC 30, and it serves as a transmitter or receiver. For example, the communication portion 216 can receive content data such as a TV program or a movie which are broadcasted continuously (in real time) from the content delivery server 10 through a radio wave. The content data that are transmitted from the content delivery server 10 may have a digital format or an analog format.

The communication portion 216 may be software for implementing the communication unit 215 shown in FIG. 3 or the communication unit 215 that operates based on the software. Although FIG. 4 shows a case where the communication portion 216 and the content delivery server 10 directly communicate with each other, the communication portion 216 and the content delivery server 10 may communicate through the communication network 12 as shown in FIG. 1.

The recording portion 218 records the content data that are received by the communication portion 216 into the storage portion 220. The recording portion 218 may obtain the content data that are recorded in an optical disk or a flash memory and record the data into the storage portion 220.

The storage portion 220 serves as a memory to store content data. The storage portion 220 may be nonvolatile memory such as EEPROM (Electrically Erasable Programmable Read-Only Memory) and EPROM (Erasable Programmable Read-Only Memory), magnetic disks such as hard disk and discoid magnetic disk, optical discs such as CD-R (Compact Disc Recordable)/RW (ReWritable), DVD-R (Digital Versatile Disc Recordable)/RW/+R/+RW/RAM (Random Access Memory) and BD (Blu-ray Disc (registered trademark))-R/BD-RE, or memory such as MO (Magneto Optical) disk.

The operating portion 224 includes the instruction operating portion 23, the hold operating portion 26 and the volume operating portion 28, and it detects various user operations to the portable device 20. For example, the instruction operating portion 23 detects an instruction operation that instructs playback, fast-forwarding, pause, track skipping or the like of content data. The hold operating portion 26 detects a hold-on operation that instructs setting to a hold-on state which does not accept an instruction operation to the instruction operating portion 23 and a hold-off operation that instructs release of the hold-on state. The volume operating portion 28 detects a volume-up instruction and a volume-down instruction of content data to be played back.

The control portion 230 includes an operation control portion 232 and a state control portion 234, and it controls the overall operation of the portable device 20.

The operation control portion 232 controls the portable device 20 to execute the processing which corresponds to a user operation that is detected by the operating portion 224. For example, when a playback instruction of content data is detected by the instruction operating portion 23, the operation control portion 232 makes control so as to supply the content data from the storage portion 220 to the playback portion 240 and play back the content data by the playback portion 240. Further, when a volume-down instruction of a playback volume of content data is detected by the volume operating portion 28, the operation control portion 232 makes control so as to reduce the volume of a sound that is output from a sound output portion 264 in the playback portion 240.

The state control portion 234 sets the portable device 20 to the hold-on state in response to a hold-on operation that is detected by the hold operating portion 26, and sets the portable device 20 to the hold-off state in response to a hold-ff operation that is detected by the hold operating portion 26. The hold-on state is a state that does not accept an instruction operation to the instruction operating portion 23. For example, the hold-on state may be a state that stops the operation of detecting an instruction operation in the instruction operating portion 23 or a state that cancels an instruction operation that is detected by the instruction operating portion 23. Thus, even if a user performs an operation to instruct the execution of prescribed processing to the instruction operating portion 23 during the hold-on state, the portable device 20 does not execute the prescribed processing. On the other hand, during the hold-off state, the portable device 20 executes processing according to an operation that is performed by a user onto the instruction operating portion 23.

The operation control portion 232 may accept a volume control operation that is detected by the volume operating portion 28 even when the portable device 20 is in the hold-on state. In such a configuration, if a user performs a volume control operation onto the volume operating portion 28, for example, the volume of a sound that is played back is adjusted regardless of whether or not the hold-on state is set by the state control portion 234. This is effective in that a user does not have to release the hold-on state for volume control.

Further, the state control portion 234 controls a power to be supplied from the power supply portion 270 to the playback portion 240 according to the hold-on operation or the hold-off operation that is detected by the hold operating portion 26. The power supply portion 270 supplies a power to the playback portion 240 according to the control by the state control portion 234. Specific examples of the function and the operation of the state control portion 234 and the power supply portion 270 are described later with reference to FIGS. 5 to 11.

The playback portion 240 includes a video processing portion 250 and a sound processing portion 260, and it plays back the content data that are stored in the storage portion 220 or the content data that are received by the communication portion 216. The video processing portion 250 includes a video decoding portion 252 and a display portion 254. The sound processing portion 260 includes a sound decoding portion 262 and a sound output portion 264.

The video decoding portion 252 decodes video data that are input from the communication portion 216 or the storage portion 220. For example, the video decoding portion 252 may decode video data in data formats such as JPEG (Joint Photographic coding Experts Group), MPEG (Moving Picture Experts Group) 1, MPEG2 and MPEG 4.

The display portion 254 displays video data that are decoded by the video decoding portion 252. The display portion 254 corresponds to the display portion 21 in FIG. 2A or the output unit 210 in FIG. 3, and it may be a liquid crystal display, for example.

The sound decoding portion 262 decodes sound data that are input from the communication portion 216 or the storage portion 220. For example, the sound decoding portion 262 may decode sound data in data formats such as MP3 (MPEG1 Layer-3), AAC (Advanced Audio Codec), LPCM (Linear PCM), WMA9 (Windows Media Audio9), ATRAC (Adaptive TRansform Acoustic Coding), and ATRAC3.

The sound output portion 264 outputs sound data that are decoded by the sound decoding portion 262. The sound output portion 264 corresponds to the sound output portion 22 in FIG. 2A or the output unit 210 in FIG. 3, and it may be earphones or a headphone, for example.

The configuration of the portable device 20 according to this embodiment is described in the foregoing with reference to FIGS. 3 and 4. An example of the way of controlling the playback portion 240 by the state control portion 234 is described hereinbelow.

The state control portion 234 of this embodiment controls a power to be supplied from the power supply portion 270 to the playback portion 240 based on the hold-on operation or the hold-off operation that is detected by the hold operating portion 26 and controls the operation and suspension of the playback portion 240 as described earlier. For example, the state control portion 234 may turn on or turn off the video decoding portion 252. The state control portion 234 may switch on or off the video decoding portion 252 by controlling whether the power supply portion 270 supplies a power to the video decoding portion 252.

Likewise, the state control portion 234 may turn on the display portion 254 by controlling the power supply portion 270 to supply a power to the display portion 254 or turn off the display portion 254 by controlling the power supply portion 270 not to supply a power to the display portion 254. If the display portion 254 is a liquid crystal display, the state where the display portion 254 is off may be at least one of a state where a backlight of the liquid crystal display is shut off or a state where voltage application to liquid crystal molecules is stopped. Further, the state control portion 234 may turn on the sound processing portion 260 by controlling the power supply portion 270 to supply a power to the sound processing portion 260 or turn off the sound processing portion 260 by controlling the power supply portion 270 not to supply a power to the sound processing portion 260.

The state control portion 234 may control on/off of each element in the playback portion 240 at various timings based on the detection of the hold-on operation or the hold-off operation by the hold operating portion 26. Exemplary patterns of the timings when the state control portion 234 controls on/off of each element in the playback portion 240 are described hereinbelow with reference to the drawings.

(Control Pattern 1)

A case where the state control portion 234 turns on/off each element in the playback portion 240 according to a control pattern 1 is described below. The control pattern 1 allows reduction of a time difference between the detection of the hold-on operation or the hold-off operation and the turn-on/off of video display on the display portion 254.

Figure 5:
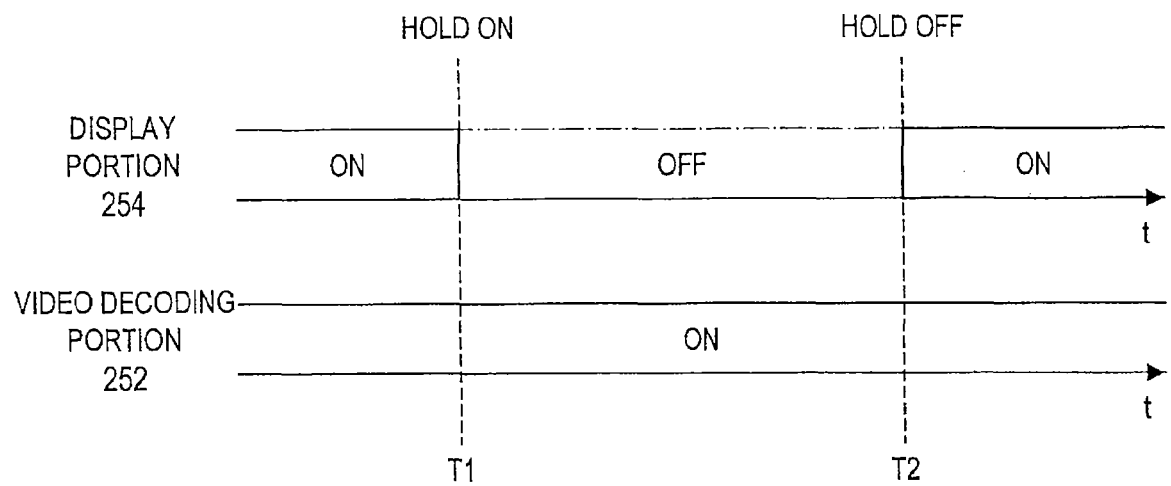
FIG. 5 is an illustration showing on/off control of a video processing portion by a state control portion.

FIG. 5 is an illustration showing the on/off control of the video processing portion 250 by the state control portion 234. FIG. 5 shows a case where the hold-on operation is detected at timing T1 so that the portable device 20 is set to the hold-on state, and the hold-off operation is detected at timing T2 so that the portable device 20 is set to the hold-off state.

In the control pattern 1, at the timing T1 when the hold-on operation is detected, the state control portion 234 controls the power supply portion 270 to stop supplying a power to the display portion 254, thereby turning off the display portion 254. At the timing T2 when the hold-off operation is detected, the state control portion 234 controls the power supply portion 270 to start supplying a power to the display portion 254.

On the other hand, the state control portion 234 controls the power supply portion 270 to continuously supply a power to the video decoding portion 252 regardless of the presence or absence of the hold-on operation and the hold-off operation. In this control pattern, the sound processing portion 260 stays on regardless of the presence or absence of the hold-on operation and the hold-off operation.

The above-described control pattern 1 allows the display portion 254 to be in the off-state while the hold-on state is set, thereby suppressing power consumption in the display portion 254 and the portable device 20. Further, the video decoding portion 252 sometimes takes time before outputting decoded video data after power supply is started. Thus, setting the video decoding portion 252 to be continuously in the on state as in the control pattern 1 enables the reduction of a time difference between the detection of the hold-off operation and the display of a video on the display portion 254.

(Control Pattern 2)

A case where the state control portion 234 turns on/off each element in the playback portion 240 according to a control pattern 2 is described below. The control pattern 2 allows further reduction of power consumption in the portable device 20.

Figure 6:
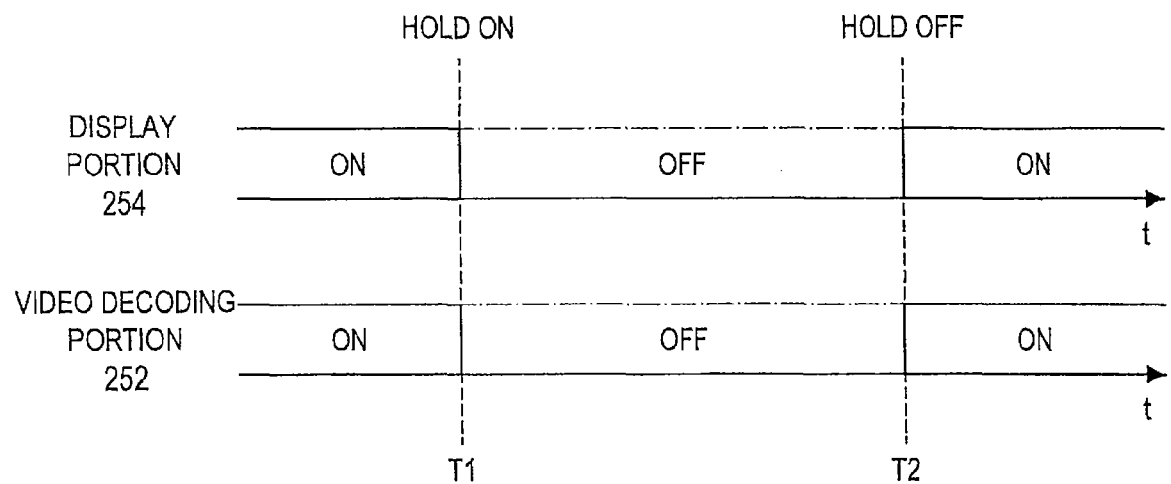
FIG. 6 is an illustration showing another on/off control of a video processing portion by a state control portion.

FIG. 6 is an illustration showing the on/off control of the video processing portion 250 by the state control portion 234. FIG. 6 shows a case where the hold-on operation is detected at timing T1 so that the portable device 20 is set to the hold-on state, and the hold-off operation is detected at timing T2 so that the portable device 20 is set to the hold-off state.

In the control pattern 2, at the timing T1 when the hold-on operation is detected, the state control portion 234 controls the power supply portion 270 to stop supplying a power to the display portion 254, thereby turning off the display portion 254. At the timing T2 when the hold-off operation is detected, the state control portion 234 controls the power supply portion 270 to start supplying a power to the display portion 254.

Further, the state control portion 234 turns off the video decoding portion 252 at the timing T1 when the hold-on operation is detected. Then, the state control portion 234 turns on the video decoding portion 252 at the timing T2 when the hold-off operation is detected. In this control pattern, the sound processing portion 260 stays on regardless of the presence or absence of the hold-on operation and the hold-off operation.

Figure 7:
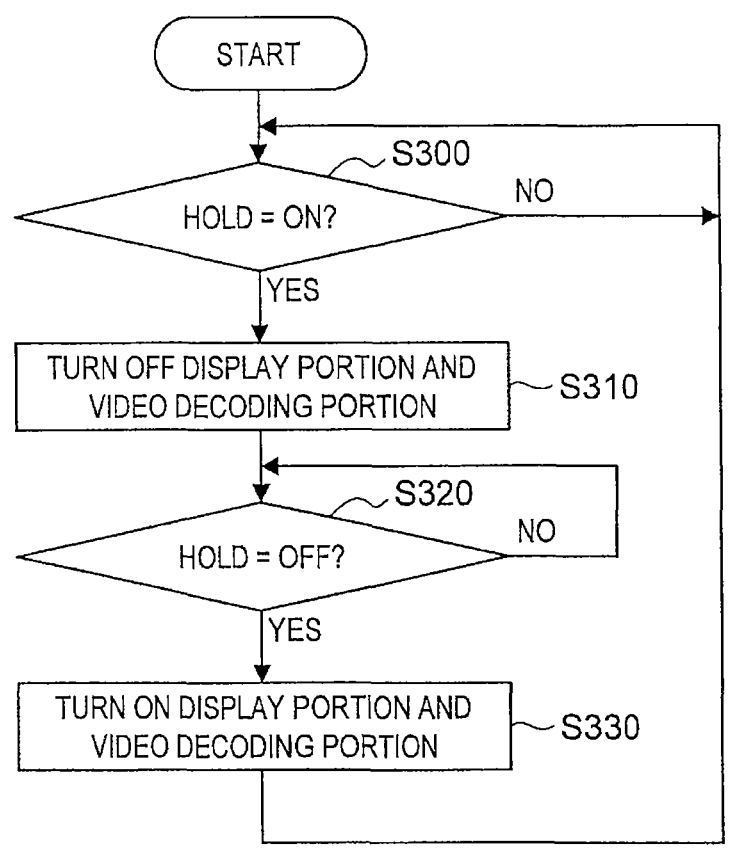
FIG. 7 is a flowchart showing the flow of control by a state control portion.

FIG. 7 is a flowchart showing the flow of the control by the state control portion 234 according to the above-described control pattern 2. First, the state control portion 234 determines whether the portable device 20 is currently in the hold-on state or not (S300). If the state control portion 234 determines that the portable device 20 is currently not in the hold-on state, it repeats the processing of S300.

On the other hand, if the state control portion 234 determines in S300 that the portable device 20 is currently in the hold-on state, it turns off the display portion 254 and the video decoding portion 252 (S310). Then, the state control portion 234 determines whether the hold-off operation is detected by the hold operating portion 26 or not (S320). If the state control portion 234 determines that the hold-off operation is not detected, it repeats the processing of S320. On the other hand, if the state control portion 234 determines in S320 that the hold-off operation is detected, it turns on the display portion 254 and the video decoding portion 252 (S330).

The above-described control pattern 2 allows the display portion 254 and the video decoding portion 252 to be in the off-state while the hold-on state is set, thereby further suppressing power consumption in the video processing portion 250 and the portable device 20.

(Control Pattern 3)

A case where the state control portion 234 turns on/off each element in the playback portion 240 according to a control pattern 3 is described below. The control pattern 3 prevents video display from being stopped when a user performs the hold-on operation by mistake.

Figure 8:
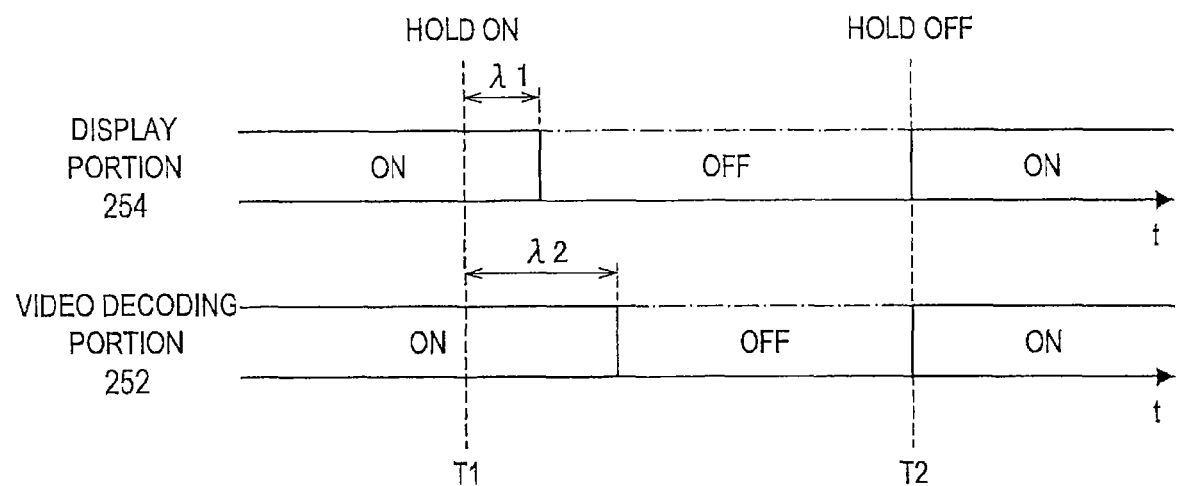
FIG. 8 is an illustration showing another on/off control of a video processing portion by a state control portion.

FIG. 8 is an illustration showing the on/off control of the video processing portion 250 by the state control portion 234. FIG. 8 shows a case where the hold-on operation is detected at timing T1 so that the portable device 20 is set to the hold-on state, and the hold-off operation is detected at timing T2 so that the portable device 20 is set to the hold-off state.

In the control pattern 3, when a time $\lambda 1$ (a first prescribed time) is elapsed from the timing T1 when the hold-on operation is detected, the state control portion 234 controls the power supply portion 270 to stop supplying a power to the display portion 254, thereby turning off the display portion 254. At the timing T2 when the hold-off operation is detected, the state control portion 234 controls the power supply portion 270 to start supplying a power to the display portion 254, thereby turning on the display portion 254.

Further, the state control portion 234 turns off the video decoding portion 252 when a time $\lambda 2$ (a second prescribed time) is elapsed from the timing T1 when the hold-on operation is detected. The state control portion 234 turns on the video decoding portion 252 at the timing T2 when the hold-off operation is detected.

As described above, the control pattern 3 does not immediately shut off the power supply to the playback portion 240 when the hold-on operation is detected. The control pattern 3 can thereby prevent video display on the display portion 254 from being stopped when a user performs the hold-on operation accidentally or unconsciously.

(Control Pattern 4)

A case where the state control portion 234 turns on/off each element in the playback portion 240 according to a control pattern 4 is described below. The control pattern 4 allows a video to be temporarily displayed on the display portion 254 even during the hold-on state.

Figure 9:
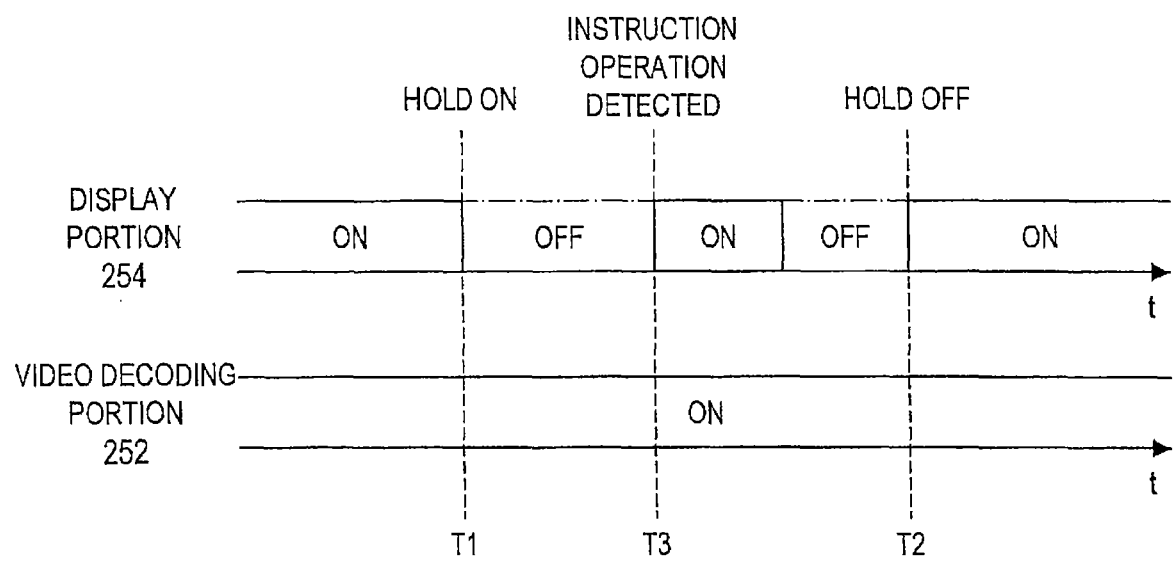
FIG. 9 is an illustration showing another on/off control of a video processing portion by a state control portion.

FIG. 9 is an illustration showing the on/off control of the video processing portion 250 by the state control portion 234.

FIG. 9 shows a case where the hold-on operation is detected at timing T1 so that the portable device 20 is set to the hold-on state, the instruction operation is detected at timing T3, and the hold-off operation is detected at timing T2 so that the portable device 20 is set to the hold-off state.

In the control pattern 4, at the timing T1 when the hold-on operation is detected, the state control portion 234 controls the power supply portion 270 to stop supplying a power to the display portion 254, thereby turning off the display portion 254. At the timing T3 when the instruction operation that instructs the portable device 20 to execute prescribed processing is detected, the state control portion 234 makes control so as to temporarily supply a power to the display portion 254, thereby turning on the display portion 254. At the timing T2 when the hold-off operation is detected, the state control portion 234 controls the power supply portion 270 to start supplying a power to the display portion 254, thereby turning on the display portion 254.

On the other hand, the state control portion 234 controls the video decoding portion 252 to continuously operate regardless of the presence or absence of the instruction operation, the hold-on operation and the hold-off operation. In this control pattern, the sound processing portion 260 stays on regardless of the presence or absence of the hold-on operation and the hold-off operation.

The above-described control pattern 4 permits the temporary display of a video on the display portion 254 during the hold-on state in response to the instruction operation that is performed by a user of the portable device 20. For example, even when video display is stopped, a user may want to watch a video of content data based on a sound of the content data that is being played back. The control pattern 4 allows a user to easily display the video temporarily on the display portion 254, which is convenient.

(Control Pattern 5)

A case where the state control portion 234 turns on/off each element in the playback portion 240 according to a control pattern 5 is described below. The control pattern 5 prevents video display on the display portion 254 from being restarted when a user performs the hold-off operation by mistake.

Figure 10:
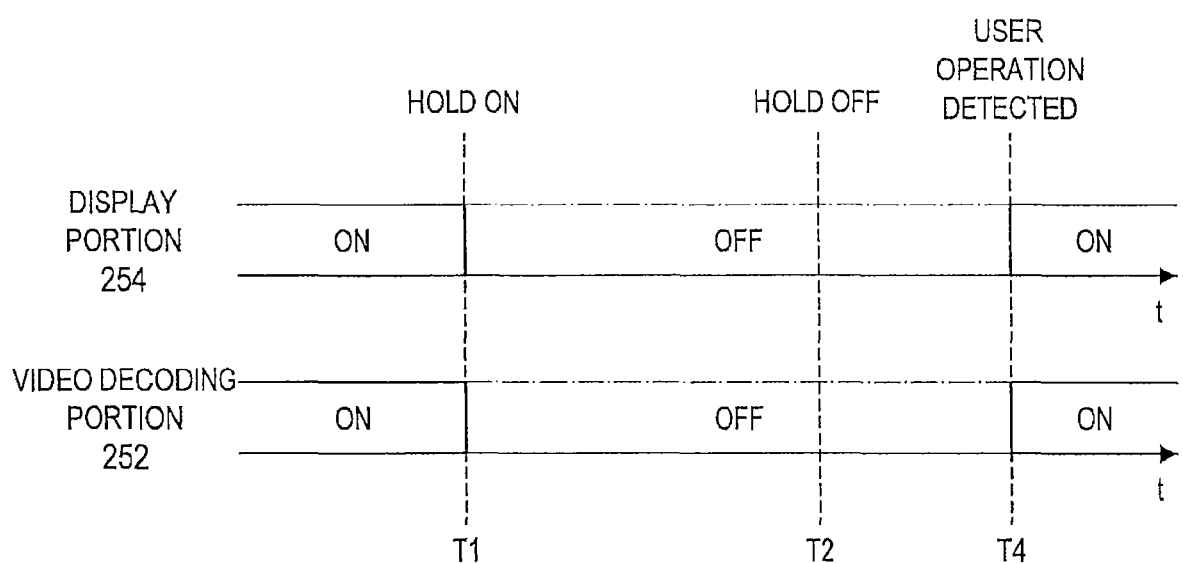
FIG. 10 is an illustration showing another on/off control of a video processing portion by a state control portion.

FIG. 10 is an illustration showing the on/off control of the video processing portion 250 by the state control portion 234. FIG. 10 shows a case where the hold-on operation is detected at timing T1 so that the portable device 20 is set to the hold-on state, the hold-off operation is detected at timing T2 so that the portable device 20 is set to the hold-off state, and a given user operation is detected at timing T4.

In the control pattern 5, at the timing T1 when the hold-on operation is detected, the state control portion 234 controls the power supply portion 270 to stop supplying a power to the display portion 254, thereby turning off the display portion 254. At the timing T4 when a given user operation is detected after the timing T2 when the hold-off operation is detected, the state control portion 234 controls the power supply portion 270 to start supplying a power to the display portion 254.

Likewise, at the timing T1 when the hold-on operation is detected, the state control portion 234 turns off the video decoding portion 252. At the timing T4 when a given user operation is detected after the timing T2 when the hold-off operation is detected, the state control portion 234 turns on the video decoding portion 252. In this control pattern, the sound processing portion 260 stays on regardless of the presence or absence of the hold-on operation and the hold-off operation.

Figure 11:
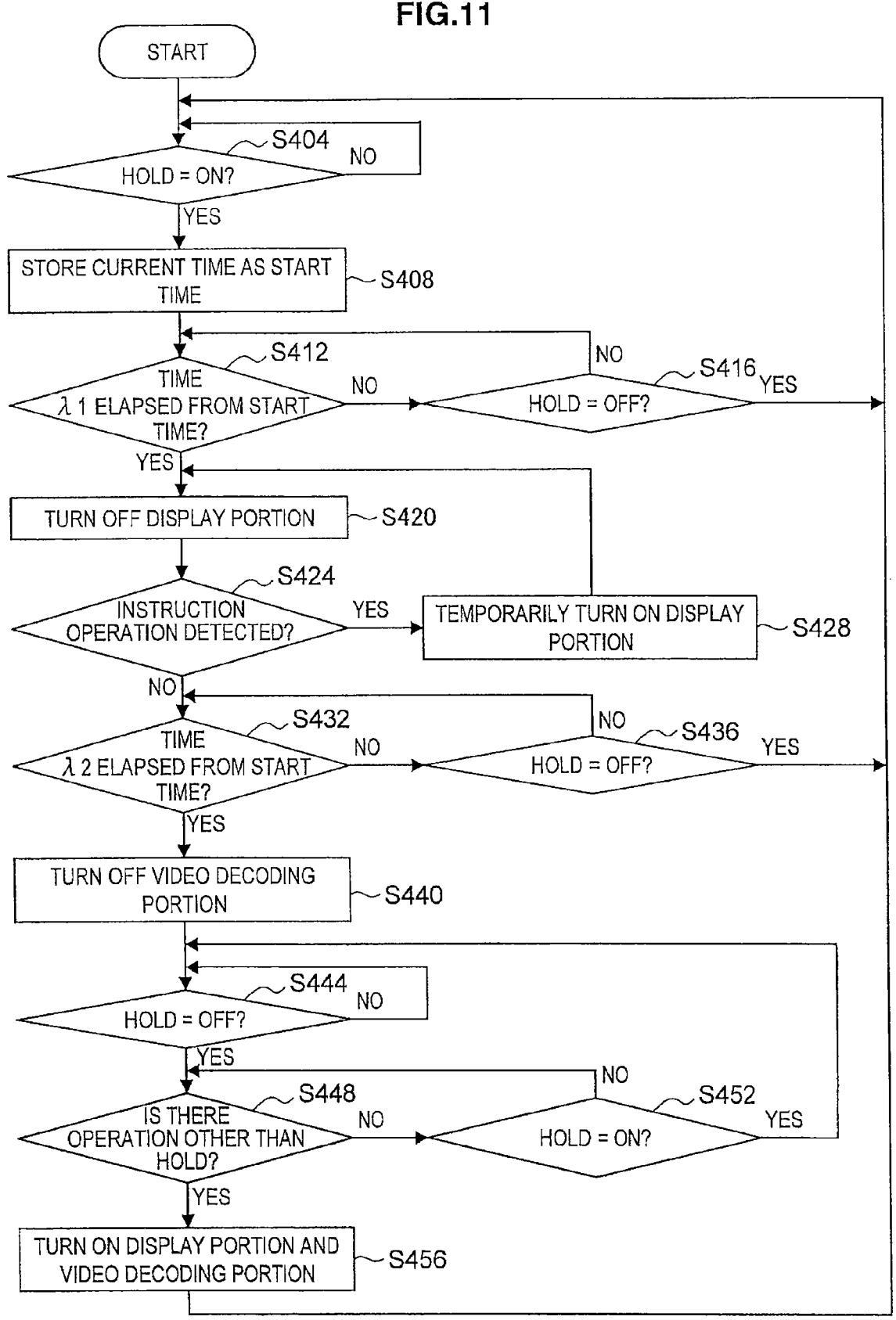
FIG. 11 is a flowchart showing the flow of a playback method by a state control portion according to the first embodiment of the present invention.

FIG. 11 is a flowchart showing the flow of a playback method by the state control portion 234 where the above-described control patterns 3, 4 and 5 are applied. Firstly, the state control portion 234 determines whether the portable device 20 is currently in the hold-on state or not (S404). If the state control portion 234 determines that the portable device 20 is currently not in the hold-on state, it repeats the processing of S404. On the other hand, if the state control portion 234 determines that the portable device 20 is currently in the hold-on state, it stores a current time as a start time (S408).

Then, the state control portion 234 determines whether the time $\lambda 1$ is elapsed from the start time or not (S412). If the state control portion 234 determines that the time $\lambda 1$ is not yet elapsed from the start time, it returns to the processing of S404 when the portable device 20 is in the hold-off state or returns to the processing of S412 when the portable device 20 is not in the hold-off state (S416). On the other hand, if the state control portion 234 determines in S412 hat the time $\lambda 1$ is elapsed from the start time, it turns off the display portion 254 (S420).

After that, the state control portion 234 determines whether the instruction operation is detected by the instruction operating portion 23 or not (S424). If the state control portion 234 determines that the instruction operation is detected by the instruction operating portion 23, it temporarily turns on the display portion 254 (S428). On the other hand, if the state control portion 234 determines that the instruction operation is not detected by the instruction operating portion 23, it determines whether the time $\lambda 2$ is elapsed from the start time or not (S432).

If the state control portion 234 determines in S432 that the time $\lambda 2$ is not yet elapsed from the start time, it returns to the processing of S404 when the portable device 20 is in the hold-off state or returns to the processing of S432 when the portable device 20 is not in the hold-off state (S436). On the other hand, if the state control portion 234 determines in S432 that the time $\lambda 2$ is elapsed from the start time, it turns off the video decoding portion 252 (S440).

Further, the state control portion 234 determines whether the portable device 20 is in the hold-off state or not (S444). If the state control portion 234 determines that the portable device 20 is not in the hold-off state, it repeats the processing of S444. On the other hand, if the state control portion 234 determines that the portable device 20 is in the hold-off state, it determines whether a given user operation on the operating portion 224 is detected or not (S448).

If the state control portion 234 determines in S448 that a given user operation is not detected, it returns to the processing of S444 when the portable device 20 is in the hold-on state or returns to the processing of S448 when the portable device 20 is in the hold-off state (S452). On the other hand, if the state control portion 234 determines in S448 that a given user operation is detected, it turns on the display portion 254 and the video decoding portion 252 and then returns to the processing of S404.

The state control portion 234 of this embodiment can turn on or off each element in the playback portion 240 by a variety of control patterns or combinations of control patterns as described above. The control pattern may be selected by a user on a display screen as shown in FIG. 12.

Figure 12:
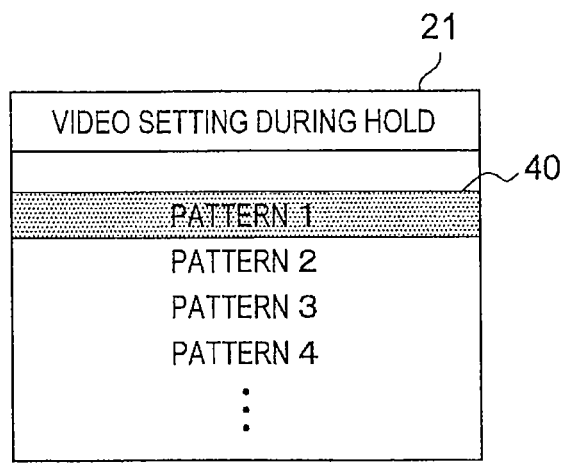
FIG. 12 is an illustration showing an exemplary setting screen of a control pattern used by a state control portion.

FIG. 12 is an illustration showing an example of a setting screen of a control pattern to be used by the state control portion 234. The setting screen of the control pattern that is displayed on the display portion 254 may include "pattern 1" corresponding to the control pattern 1, "pattern 2" corresponding to the control pattern 2, "pattern 3" corresponding to the control pattern 3, "pattern 4" corresponding to the control pattern 4 and so on as options to be selected. A user manipulates the instruction operating portion 23 and moves a cursor 40 to a desired option from the options to be selected, thereby setting a control pattern to be used by the state control portion 234.

A video that is displayed on the display portion 254 may be a video that is decoded from video data included in content data by the video decoding portion 252 or a video that indicates a playback status of content data having sound data. An example of the video that indicates a playback status of content data is described hereinafter with reference to FIG. 13.

Figure 13:
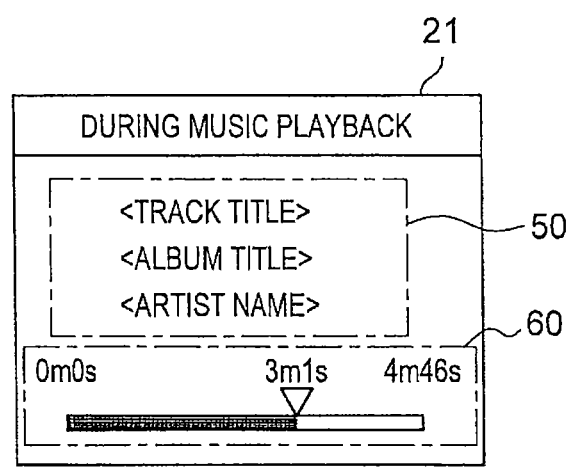
FIG. 13 is an illustration showing an exemplary video image indicating a playback status of content data that is displayed on a display portion.

FIG. 13 is an illustration showing an exemplary video image which indicates a playback status of content data that are displayed on the display portion 254. The video which indicates a playback status of content data that are displayed on the display portion 254 includes content information 50 and a progress bar 60.

The content information 50 is information of content data that are currently played back. For example, the content information 50 may include a content name, an album title, an artist name, a genre, a playback number and so on. In the example of FIG. 13, the content information 50 includes a content name (track title), an album title and an artist name.

The progress bar 60 is information that indicates the degree that certain content data are played back up to the present time. The example of FIG. 13 shows a case where the content data having an entire length of 4 minutes and 46 seconds is played back up to the point of 3 minutes and 1 second. A colored region may extend to the right in FIG. 13 as playback of content data progresses.

As described in the foregoing, the portable device 20 according to the first embodiment of the present invention suspends at least a part of processing for displaying a video when the hold-on operation is detected. Therefore, in a scene where a user cannot view a display screen such as on a crowded train or during driving or in a case where content data in which a video is not necessarily important is played back, a user performs the hold-on operation onto the hold operating portion 26 so as to suspend at least a part of processing in the video processing portion 250, thereby suppressing power consumption in the video processing portion 250 and the portable device 20.

Further, the portable device 20 according to this embodiment is capable of performing the setting of the hold-on state and the suspension of at least a part of processing in the video processing portion 250 in conjunction with each other in accordance with the hold-on operation. It is thereby possible to set the portable device 20 to the hold-on state and suspend at least a part of processing in the video processing portion 250 simply by user's hold-on operation performed onto the hold operating portion 26, thereby improving the user-friendliness.

Second Embodiment

A second embodiment of the present invention is described hereinafter. The portable device 20 according to this embodiment is capable of performing the setting of the hold-on state and the suspension of at least a part of processing in the sound processing portion 260 in conjunction with each other in accordance with the hold-on operation. The configuration of the portable device 20 of this embodiment is substantially the same as that of the first embodiment described with reference to FIGS. 3 and 4, and is thus not repeatedly described herein.

Figure 14:
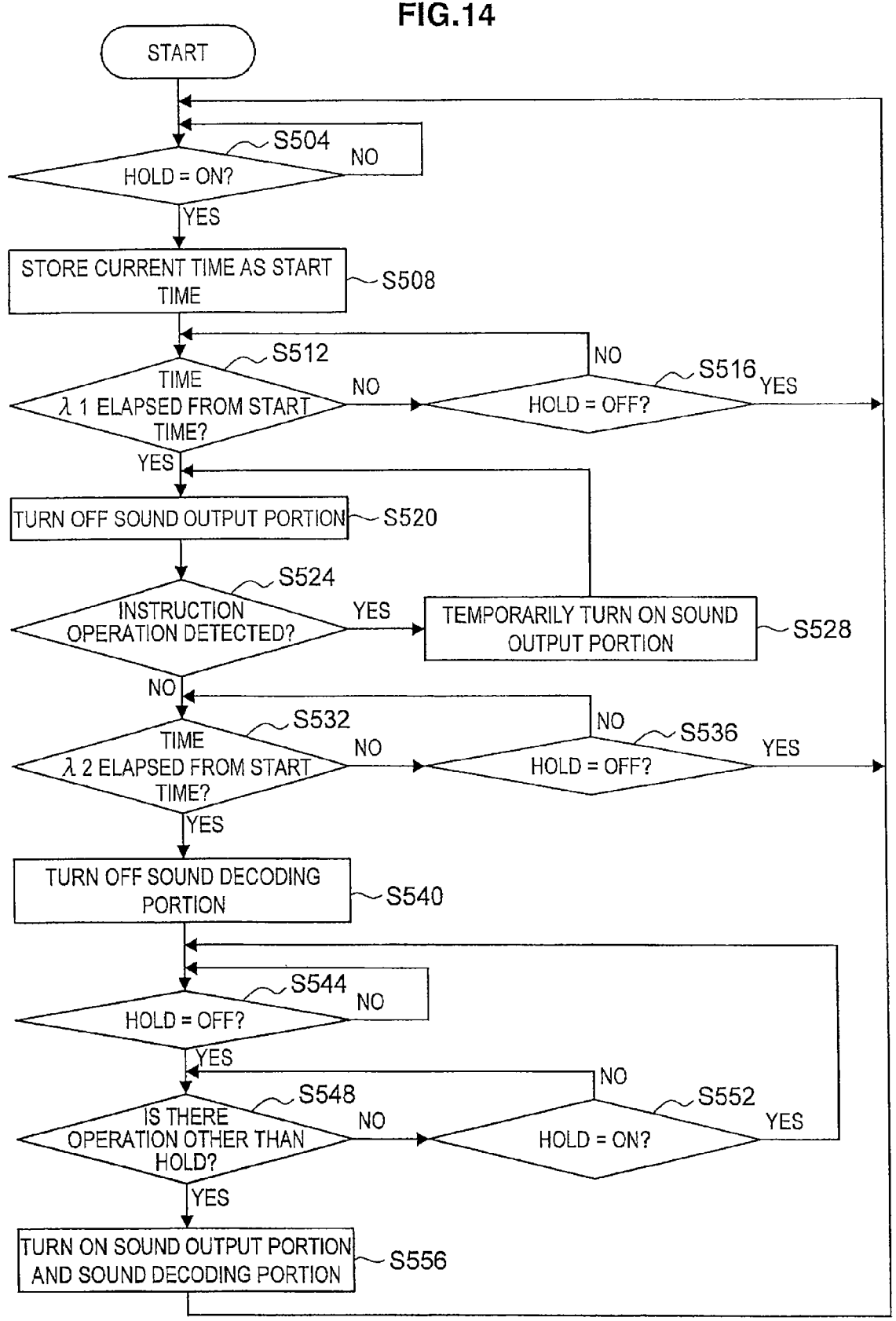
FIG. 14 is a flowchart showing the flow of a playback method by a state control portion according to a second embodiment of the present invention.

FIG. 14 is a flowchart showing the flow of a playback method by the state control portion 234 according to this embodiment. Firstly, the state control portion 234 of this embodiment determines whether the portable device 20 is currently in the hold-on state or not (S504). If the state control portion 234 determines that the portable device 20 is currently not in the hold-on state, it repeats the processing of S504. On the other hand, if the state control portion 234 determines that the portable device 20 is currently in the hold-on state, it stores a current time as a start time (S508).

Then, the state control portion 234 determines whether the time $\lambda 1$ is elapsed from the start time or not (S512). If the state control portion 234 determines that the time $\lambda 1$ is not yet elapsed from the start time, it returns to the processing of S504 when the portable device 20 is in the hold-off state or returns to the processing of S512 when the portable device 20 is not in the hold-off state (S516). On the other hand, if the state control portion 234 determines in S512 that the time $\lambda 1$ is elapsed from the start time, it turns off the sound output portion 264 (S520).

After that, the state control portion 234 determines whether the instruction operation is detected by the instruction operating portion 23 or not (S524). If the state control portion 234 determines that the instruction operation is detected by the instruction operating portion 23, it temporarily turns on the sound output portion 264 (S528). On the other hand, if the state control portion 234 determines that the instruction operation is not detected by the instruction operating portion 23, it determines whether the time $\lambda 2$ is elapsed from the start time or not (S532).

If the state control portion 234 determines in S532 that the time $\lambda 2$ is not yet elapsed from the start time, it returns to the processing of S504 when the portable device 20 is in the hold-off state or returns to the processing of S532 when the portable device 20 is not in the hold-off state (S536). On the other hand, if the state control portion 234 determines in S532 that the time $\lambda 2$ is elapsed from the start time, it turns off the sound decoding portion 262.

Further, the state control portion 234 determines whether the portable device 20 is in the hold-off state or not (S544). If the state control portion 234 determines that the portable device 20 is not in the hold-off state, it repeats the processing of S544. On the other hand, if the state control portion 234 determines that the portable device 20 is in the hold-off state, it determines whether a given user operation on the operating portion 224 is detected or not (S548).

If the state control portion 234 determines in S548 that a given user operation is not detected, it returns to the processing of S544 when the portable device 20 is in the hold-on state or returns to the processing of S548 when the portable device 20 is in the hold-off state (S552). On the other hand, if the state control portion 234 determines in S548 that a given user operation is detected, it turns on the sound output portion 264 and the sound decoding portion 262 and then returns to the processing of S504.

As described in the foregoing, the portable device 20 according to the second embodiment of the present invention suspends at least a part of processing for outputting a sound when the hold-on operation is detected. Therefore, in a place where a sound should not be output from the portable device 20 such as on a train or in a coffee shop, a user performs the hold-on operation onto the hold operating portion 26 so as to suspend at least a part of processing in the sound processing portion 260, thereby suppressing power consumption of the sound processing portion 260 and the portable device 20.

Further, the portable device 20 according to this embodiment is capable of performing the setting of the hold-on state and the suspension of at least a part of processing in the sound processing portion 260 in conjunction with each other in accordance with the hold-on operation. It is thereby possible to set the portable device 20 to the hold-on state and suspend at least a part of processing in the sound processing portion

260 simply by user's hold-on operation performed onto the hold operating portion 26, thereby improving the user-friendliness.

It should be understood by those skilled in the art that various modifications, combinations, sub-combinations and alterations may occur depending on design requirements and other factors insofar as they are within the scope of the appended claims or the equivalents thereof.

For example, although the first embodiment describes the operation of the state control portion 234 using the control patterns 1 to 5 as examples, the present invention is not limited to those examples. For example, the state control portion 234 may turn off the video decoding portion 252 only upon detection of the hold-on operation. Various other alternative examples may be also possible.

Further, although the first embodiment describes the configuration that determines the lapse of the time $\lambda 1$ and $\lambda 2$ using a start time as shown in FIG. 11, the present invention is not limited to such an example. For example, the state control portion 234 may use a timer that counts down from the time $\lambda 1$ and a timer that counts down from the time $\lambda 2$ upon detection of the hold-on operation and determine whether the time $\lambda 1$ or $\lambda 2$ is elapsed based on whether a count value reaches 0.

Furthermore, it is not necessary to perform each step in the processing of the portable device 20 in chronological order according to the sequence shown in the given flowcharts, and the processing which is performed in parallel or individually (e.g. parallel processing or object processing) may be included.

In addition, it is possible to create a computer program that causes the hardware such as the CPU 201, the ROM 202 and the RAM 203 which are built in the portable device 20 to perform the equal function to each element of the portable device 20 described above. Further, memory that stores such a computer program may be provided.

What is claimed is:

1. A playback apparatus to play back content data including audio data and image data that are synchronously played back, the playback apparatus comprising:
   circuitry configured to
      detect a first user operation of a physical element of the playback apparatus;
      control a display portion to display an image based on the image data; and
      control an output of an audio based on the audio data, wherein
   the circuitry controls the display portion to suspend displaying of the image when the first user operation is detected while the image is displayed,
   the circuitry maintains the output of the audio regardless of a detection of the first user operation, and
   the circuitry controls the display portion to temporarily drive when the circuitry detects a second user operation of the physical element of the playback apparatus while the displaying of the image is suspended.

2. The play back apparatus according to claim 1, wherein the circuitry controls the display portion to temporarily display the image when the circuitry detects the second user operation while the displaying of the image is suspended.

3. The playback apparatus according to claim 1, wherein in response to detecting the first user operation, the circuitry enters a state of not accepting inputs until a hold release operation is detected, and
   the circuitry controls the display portion to restart the displaying of the image when the hold release operation is detected.

4. The playback apparatus according to claim 1, wherein in response to detecting the first user operation, the circuitry enters a state of not accepting inputs until a hold release operation is detected, and
   the circuitry controls the display portion to restart the displaying of the image when a third user operation is detected by the circuitry after the hold release operation is detected by the circuitry.

5. The playback apparatus according to claim 1, wherein the circuitry detects a volume control operation that controls a volume of the output of the audio,
   in response to detecting the first user operation, the circuitry enters a state of not accepting inputs, and
   the volume control operation is effective while the state of not accepting inputs is set.

6. The playback apparatus according to claim 5, further comprising a volume operating portion which receives the volume control operation.

7. The playback apparatus according to claim 6, wherein the volume operating portion is positioned at a first side face of the playback apparatus.

8. The playback apparatus according to claim 7, further comprising a hold operating portion which receives the first user operation,
   wherein the hold operating portion is positioned at a second side face of the playback apparatus different from the first side face.

9. The playback apparatus according to claim 1, further comprising a hold operating portion which receives the first user operation,
   wherein the hold operating portion is positioned at a second side face of the playback apparatus.

10. The playback apparatus according to claim 9, further comprising a volume operating portion which receives a volume control operation,
    wherein the volume operating portion is positioned at a first side face of the playback apparatus different from the second side face.

11. The playback apparatus according to claim 10, wherein the circuitry detects the volume control operation that controls a volume of the output of the audio,
    in response to detecting the first user operation, the circuitry enters a state of not accepting inputs, and
    the volume control operation is effective while the state of not accepting inputs is set.

12. The playback apparatus according to claim 9, further comprising a sound output portion, which is positioned at a first side face of the playback apparatus different from the second side face, having a function of the output of the audio.

13. The playback apparatus according to claim 1, wherein the image is one of a still image, a moving image, or an image that indicates a playback status of the content data.

14. The playback apparatus according to claim 13, wherein the image that indicates the playback status of the content data includes at least one of content information or a progress bar.

15. The playback apparatus according to claim 14, wherein the content information includes at least one of a content name, an album title, an artist name, a genre, or playback number.

16. The playback apparatus according to claim 1, wherein the display portion includes a liquid crystal display having a backlight.

17. The playback apparatus according to claim 16, wherein the circuitry causes the backlight to shut off in order to suspend the displaying of the image.

18. The playback apparatus according to claim 16, wherein the circuitry performs a stop of voltage application to the liquid crystal display in order to suspend the displaying of the image.

19. The playback apparatus according to claim 1, wherein the circuitry receives the content data from an external device via a network.

20. The playback apparatus according to claim 1, wherein the content data is stored in a storage of the playback apparatus.

21. The playback apparatus according to claim 1, wherein the playback apparatus is one of a mobile phone, a portable music playback apparatus, a portable video processing apparatus, a PDA (Personal Digital Assistant), a portable game device, or a household electrical appliance.

22. The playback apparatus according to claim 1, wherein the display portion includes an organic EL (Electro Luminescence) display.

23. A playback apparatus to play back content data including audio data and image data that are synchronously played back, the playback apparatus comprising:
   circuitry configured to
      detect a first user operation;
      control a display portion to display an image based on the image data; and
      control an output of an audio based on the audio data, wherein
   the circuitry controls the display portion to suspend displaying of the image when the first user operation is detected while the image is displayed,
   the circuitry maintains the output of the audio regardless of a detection of the first user operation, and
   the circuitry controls the display portion to display an information related to the audio when the circuitry detects a second user operation while the displaying of the image is suspended.

24. The play back apparatus according to claim 23, wherein the circuitry controls the display portion to temporarily display the image when the circuitry detects the second user operation while the displaying of the image is suspended.

25. The playback apparatus according to claim 23, wherein
   in response to detecting the first user operation, the circuitry enters a state of not accepting inputs until a hold release operation is detected, and
   the circuitry controls the display portion to restart the displaying of the image when the hold release operation is detected.

26. The playback apparatus according to claim 23, wherein
   in response to detecting the first user operation, the circuitry enters a state of not accepting inputs until a hold release operation is detected, and
   the circuitry controls the display portion to restart the displaying of the image when a third user operation is detected by the circuitry after the hold release operation is detected by the circuitry.

27. The playback apparatus according to claim 23, wherein
   the circuitry detects a volume control operation that controls a volume of the output of the audio,
   in response to detecting the first user operation, the circuitry enters a state of not accepting inputs, and
   the volume control operation is effective while the state of not accepting inputs is set.

28. The playback apparatus according to claim 27, further comprising a volume operating portion which receives the volume control operation.

29. The playback apparatus according to claim 28, wherein the volume operating portion is positioned at a first side face of the playback apparatus.

30. The playback apparatus according to claim 29, further comprising a hold operating portion which receives the first user operation,
   wherein the hold operating portion is positioned at a second side face of the playback apparatus different from the first side face.

31. The playback apparatus according to claim 23, further comprising a hold operating portion which receives the first user operation,
   wherein the hold operating portion is positioned at a second side face of the playback apparatus.

32. The playback apparatus according to claim 31, further comprising a volume operating portion which receives a volume control operation,
   wherein the volume operating portion is positioned at a first side face of the playback apparatus different from the second side face.

33. The playback apparatus according to claim 32, wherein
   the circuitry detects the volume control operation that controls a volume of the output of the audio,
   in response to detecting the first user operation, the circuitry enters a state of not accepting inputs, and
   the volume control operation is effective while the state of not accepting inputs is set.

34. The playback apparatus according to claim 31, further comprising a sound output portion, which is positioned at a first side face of the playback apparatus different from the second side face, having a function of the output of the audio.

35. The playback apparatus according to claim 23, wherein the image is one of a still image, a moving image, or an image that indicates a playback status of the content data.

36. The playback apparatus according to claim 35, wherein the image that indicates the playback status of the content data includes at least one of content information or a progress bar.

37. The playback apparatus according to claim 36, wherein the content information includes at least one of a content name, an album title, an artist name, a genre, or playback number.

38. The playback apparatus according to claim 23, wherein the display portion includes a liquid crystal display having a backlight.

39. The playback apparatus according to claim 38, wherein the circuitry causes the backlight to shut off in order to suspend the displaying of the image.

40. The playback apparatus according to claim 38, wherein the circuitry performs a stop of voltage application to the liquid crystal display in order to suspend the displaying of the image.

41. The playback apparatus according to claim 23, wherein the circuitry receives the content data from an external device via a network.

42. The playback apparatus according to claim 23, wherein the content data is stored in a storage of the playback apparatus.

43. The playback apparatus according to claim 23, wherein the playback apparatus is one of a mobile phone, a portable music playback apparatus, a portable video processing apparatus, a PDA (Personal Digital Assistant), a portable game device, or a household electrical appliance.

44. The playback apparatus according to claim 23, wherein the display portion includes an organic EL (Electro Luminescence) display.

45. A system to play back content data including audio data and image data that are synchronously played back, the system comprising:
    circuitry configured to
        detect a first user operation;
        control a display portion to display an image based on the image data; and
        control an output of an audio based on the audio data, wherein
    the circuitry controls the display portion to suspend displaying of the image when the first user operation is detected while the image is displayed,
    the circuitry maintains the output of the audio regardless of a detection of the first user operation, and
    the circuitry controls the display portion to display an information related to the audio when the circuitry detects a second user operation while the displaying of the image is suspended.

\* \* \* \* \*